3,053,832
ALKYLATED CORTICAL STEROIDS
David H. Gould, Leonia, N.J., assignor to Schering Corporation, Bloomfield, N.J., a corporation of New Jersey
No Drawing. Filed Apr. 29, 1957, Ser. No. 655,476
12 Claims. (Cl. 260—239.5)

This invention relates to a new group of corticoid steroids and particularly to the 6α-methyl analogs of prednisone (1,4 - pregnadiene-17α,21-diol-3,11,20-trione), prednisolone (1,4 - pregnadiene - 11β,17α,21-triol-3,20-dione), their 9α-fluoro derivatives and the 21-esters thereof.

It is an object of this invention to provide steroid compounds having the aforementioned description which exhibit modified adrenocortical activity, i.e. more selective effects with a reduction or minimum of adverse side reaction. It is a further object of this invention to provide processes for the manufacture of these valuable steroid compounds.

The discovery of the remarkable properties of prednisone and prednisolone has been recognized as a major step forward in the treatment of arthritis and related diseases. It is now known that prednisone and prednisolone provide definite advantages over cortisone and hydrocortisone, both in their degrees of potency and exhibition of side effects. The principal advantage which has been realized with the advent of prednisone and prednisolone aside from potency, has been a reduction in mineralocorticoid activity, i.e. a decrease in salt retention. Despite the fact that the salt retention effects of prednisone and prednisolone are remarkably reduced in comparison with cortisone and hydrocortisone, there has still been room for improvement. There has been a continuing widespread interest in finding other steroids and derivatives which would perhaps be more potent than prednisone and prednisolone, but at least exhibit even less salt retaining effects. I have found that the 6α-methyl prednadienes, described above, advantageously possess such properties. The new compounds of my invention may be represented by the following general formula:

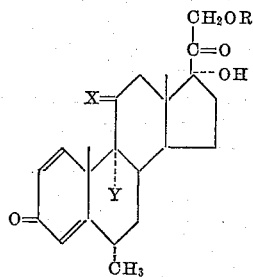

wherein X is a member of the group consisting of O and (H,βOH), Y is a member of the group consisting of H and F, and R is a member of the group consisting of H and acyl.

The new compounds of the formula may be used as the free 21-alcohol, for example, when oral administration is indicated. However, in many instances such as where intra-articular or other types of parenteral administration are indicated, the steroids are used preferably in the form of their 21-esters. It is believed that the esters are more slowly metabolized and thus remain at the site of injection for a longer period of time, therefore permitting lower doses for a given set of indications. Representative of the esters, which are advantageous, are the lower alkanoyl esters such as acetate, propionate, trimethyl acetate, cyclopentylacetate, phenoxyacetate, furoate and the like. In addition to esters with mono-basic organic acids such as described heretofore, it is sometimes advantageous to prepare esters of di- or poly-basic acids so as to provide a free acid group which upon reaction with base would render the steroid ester soluble in water or aqueous solutions. For example, a common lower alkanoyl di-basic acid used in this respect is succinic acid. The hemisuccinate of the steroid is prepared in a conventional manner and the ester is solubilized in the form of its sodium salt. Poly-basic inorganic acids also provide for water solubility, as particularly evidenced by a 21-phosphate ester. After having formed a mono-ester between the sterol and the phosphoric acid in a manner well-known in the art, the resultant 21phosphate is solubilized generally in the form of its sodio derivative. The sodium salt is soluble in a large range of solvents including water, and maintains the same high cortical activity as does the free sterol.

The compounds of my invention are prepared by first reacting a 3-keto-4-pregnene precursor (I) with a secondary amine so as to form an ene-amine. More specifically, the starting material may be cortisone, hydrocortisone, their 9α-fluoro analogs or their 21-esters, which upon reaction with a cyclic secondary amine forms a 3-amino-3,5-pregnadiene intermediate (II). In order to properly carry out the synthesis of the compounds of this new invention, especially the step requiring alkylation at C-6, it is necessary that careful selection be made in the choice of secondary amine. I prefer to use a cyclic amine which is sterically hindered, such as 2-methyl piperidine or preferably 2,6-dimethyl piperidine. The presence of the methyl groups in close proximity to the nitrogen atom effectively cages vulnerable points of attack in the ene-amine (II) molecule. Specifically, alkylation is directed towards C-6 while alkylation of the nitrogen atom or C-4 is discouraged by the presence of the methyl groups. I have further found that it is preferable to remove the water formed from the reaction between the 3-keto-4-pregnene and the piperidine so as to displace the equilibrium in the desired direction.

The crude ene-amine (II) may be alkylated merely by refluxing with a methylating agent such as methyl iodide giving rise to a 6-methyl ene-amine (III). Hydrolysis of III with mild aqueous acid or base regenerates the 3-keto-Δ⁴-pregnene thereby forming the 6α-methyl derivative of cortisone, hydrocortisone or their 9α-fluoro analogs or their 21-esters (IV).

The 6α-methyl-4-pregnene (IV) is preferably first hydrolyzed and then dehydrogenated so as to form a 1,4-pregnadiene according to methods now well-known in the art. I prefer to employ microbiological technics such as subjecting the 6α-methyl-4-pregnene to the dehydrogenating action of Bacillus sphaericus (A.T.C.C. 7055) whereby the diene (V) is easily formed. A compound of Formula V may be purified at this stage and compounded pharmaceutically for therapeutic application. If an ester is desired, said ester may be prepared in a conventional manner for preparing 21-esters such as by reacting the 21alcohol with an acylating agent such as an anhydride or acid chloride in a pyridine solution. Esters such as hemi-succinates and phosphates are conveniently prepared according to the technics fully described in the chemical and patent literature.

The following equation schematically sets forth the foregoing transformations:

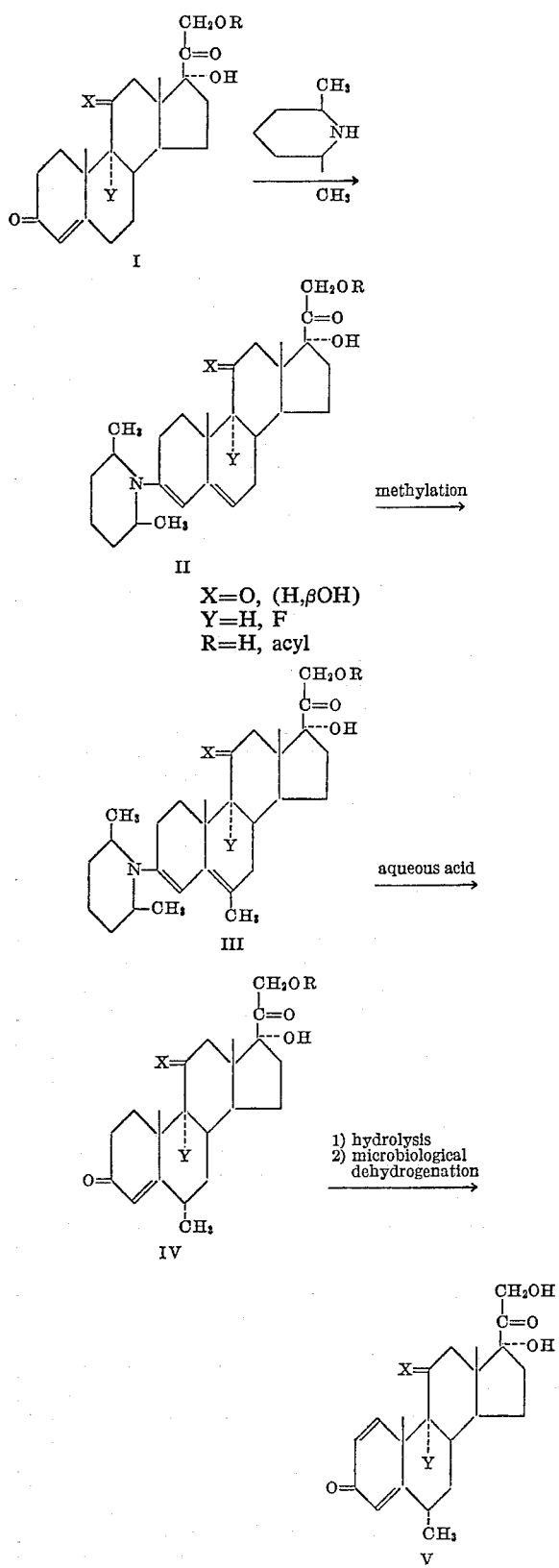

$X=O, (H,\beta OH)$
$Y=H, F$
$R=H,$ acyl

The following examples illustrate methods for preparing the new compounds of my invention. It is to be understood, however, that my invention is limited only as defined in the appended claims.

EXAMPLE 1

*9α-Fluoro-6α-Methyl-1,4-Pregnadiene-11β,17α,21-Triol-3,20-Dione*

A. 3-(2',6'-DIMETHYLPIPERIDINO)-9α-FLUORO-3,5-PREGNADIENE-11β,17α,21-TRIOL-20-ONE 21-ACETATE

Nitrogen gas is bubbled through a solution of 2 grams 9α-fluorohydrocortisone acetate, in ethylene dichloride. There is then added 0.55 g. of 2,6-dimethylpiperidine (1.05 equiv.) and 0.02 g. of p-toluene sulfonic acid. The solution is refluxed for two hours in an apparatus which permits the refluxing liquid to return through calcium carbide (to remove water) before returning to the reaction vessel. The reaction mixture is then treated with 0.01 g. of sodium bicarbonate and concentrated to dryness in vacuo. The ene-amine so obtained is used directly in the next step.

B. 9α-FLUORO-6α-METHYL-4-PREGNENE-11β,17α,21-TRIOL-3,20-DIONE 21-ACETATE

One gram of the intermediate ene-amine prepared above, is dissolved in 20 ml. of dry acetone and 20 ml. of methyl iodide. The solution is refluxed for six hours. After evaporation of the solvent, the residue is dissolved in 20 ml. of 90% acetic acid to which is added 2 g. of sodium acetate and the mixture is refluxed for 2 hours. After cooling, the mixture is diluted with water and extracted twice with methylene chloride. The extracts are combined, washed once with sodium carbonate-solution and then with water until the water washes are neutral. The methylene chloride solution is then dried over sodium sulfate, filtered, and concentrated to a small volume. Hexane is added, then this mixture is poured onto a column of activated magnesium silicate. The column is washed first with hexane, then elution is continued with dry ether in hexane. The fraction eluted with 50–75% ether in hexane is crystallized from acetone-hexane to give 9α-fluoro-6α-methyl-4-pregnene-11β,17α,21-triol-3,20-dione 21-acetate.

C. 9α-FLUORO-6α-METHYL-4-PREGNENE-11β,17α,21-TRIOL-3,20-DIONE

A sample of 0.37 g. of the product of Procedure B is dissolved in 13 ml. of 1:2 chloroform-methanol mixture, cooled to 15° C., and stirred under argon for ten minutes. Then, with continued stirring, there is quickly added 0.86 ml. of an aqueous solution containing 35 mg. of sodium hydroxide. Stirring is continued for two minutes, then 0.2 ml. of acetic acid is added, and the reaction mixture is concentrated in vacuo to dryness. The residue is suspended in warm water, filtered, and dried in a vacuum oven at 75° C. The dried solid, which is 9α-fluoro - 6α - methyl - 4 - pregnene - 11β,17α,21 - triol - 3, 20-dione, is recrystallized from acetone.

D. 9α-FLUORO-6α-METHYL-1,4-PREGNADIENE-11β,17α,21-TRIOL-3,20-DIONE

A mixture of 10 g. of yeast extract (Difco) in 1 l. of tap water, the pH of which is adjusted to 6.8–7.0, is distributed among ten 300-ml. Erlenmeyer flasks and to each flask is added an inoculum of *B. sphaericus*. The resulting suspensions are incubated at 30°C. on a shaking machine and growth is followed turbidimetrically. The starting material (0.1 g. of the product of Procedure C) is dissolved in 10 ml. of methanol. This solution is distributed equally among the ten flasks when the peak of the log phase of growth of the organism is reached. Progress of the reaction is then followed by withdrawing flasks from the shaking machine at periodic intervals, extracting the mixture with chloroform and chromatographing the extracted steroids according to the method outlined by G. M. Schull on page 9A of Abstracts of Papers, 126th Meeting of the Am. Chem. Soc., September 12–17, 1954, New York, New York. When the desired transformation is complete (3–48 hours), as shown by the disappearance of the starting material or the absence of further change in the composition of the reaction mixture, the contents of the remaining flasks are combined and extracted with chloroform. The crude chloroform extract from the transformation is concentrated to a residue which is crystallized from methylene chloride-hexane to give 9α-fluoro-6α-methyl-1,4-pregnadiene-11β,17α,21-triol-3,20-dione.

EXAMPLE 2

9α-Fluoro-6α-Methyl-1,4-Pregnadiene-11β,17α,21-Triol-3,20-Dione 21-Acetate

To 50 mg. of the product of Example 1, dissolved in 2 ml. of pyridine, is added 0.1 ml. of acetic anhydride. The solution is stirred at room temperature for two hours, poured into dilute sulfuric acid and stirred one hour longer. The precipitate is filtered, air dried, and crystallized from methanol to give 9α-fluoro-6α-methyl-1,4-pregnadiene-11β,17α,21-triol-3,20-dione 21-acetate.

In the same manner, or by using the corresponding acid chlorides instead of the anhydrides, the propionate, butyrate and isocaproate are prepared. For purification they are crystallizable from methanol or acetone-hexane.

EXAMPLE 3

9α-Fluoro-6α-Methyl-1,4-Pregnadiene-17α,21-Diol-3,11,20-Trione 21-Acetate

To a sample of 50 mg. of the product of Example 2 suspended in 5 ml. of glacial acetic acid, is added 14 mg. of chromic anhydride dissolved in 1 ml. of water. The mixture is stirred at room temperature for four hours during which time the solid goes into solution. The solution is then poured into 15 ml. of water containing 50 mg. of sodium sulfite, and allowed to stand one hour. The product, 9α-fluoro-6α-methyl-1,4-pregnadiene-17α,21-diol-3,11,20-trione 21 acetate, is filtered off, dried and crystallized from acetone-hexane.

EXAMPLE 4

6α-Methylprednisone

A. 3-(2'-METHYLPIPERIDINO)-3,5-PREGNADIENE-17α,21-DIOL-11,20-DIONE 21-DIETHYLACETATE

Using procedure A of Example 1, 2 grams of cortisone 21-diethylacetate (M.P. 167–169° C.) are treated with 0.50 g. of 2-methylpiperidine. The final residue, which is the ene-amine of this example, is used directly in the next step.

B. 6α-METHYLCORTISONE DIETHYLACETATE

Using procedure B of Example 1, 2 grams of the intermediate ene-amine prepared above are treated with 40 ml. of methyl iodide in 40 ml. of dry dimethylformamide. The intermediate is hydrolyzed with aqueous acetic acid and chromatographed. The fraction eluted with 30–50% ether in hexane is crystallized from methanol to give 6α-methylcortisone diethylacetate.

C. 6α-METHYLCORTISONE

One gram of the 6α-methylcortisone diethylacetate prepared above is treated with 90 mg. of sodium hydroxide for five minutes according to procedure C of Example 1. The crude solid is crystallized from methanol to yield 6α-methylcortisone.

D. 6α-METHYLPREDNISONE

Procedure D of Example 1 is repeated using as substrate in each flask 50 mg. of the 6α-methylcortisone prepared above. The combined extracts are concentrated and crystallized from acetone-hexene to yield 6α-methylprednisone.

EXAMPLE 5

6α-Methylprednisolone

A. 3-(2',6'-DIMETHYLPIPERIDINO)-3,5-PREGNADIENE-11β,17α,21-TRIOL-20-ONE 21-ACETATE

Procedure A of Example 1 is repeated using 2 g. of hydrocortisone acetate and 0.59 g. of 2,6-dimethylpiperidine. The semi-crystalline residue, the ene-amine intermediate, is used directly in the next step.

B. 6α-METHYLHYDROCORTISONE 21-ACETATE

The intermediate ene-amine, prepared above, is treated according to procedure B of Example 1. The crude product is chromatographed, and the fraction eluted with 25–0% hexane in ether is crystallized from acetone-hexane to yield 6α-methylhydrocortisone 21-acetate.

C. 6α-METHYLHYDROCORTISONE

The 21-acetate ester prepared above is saponified as in procedure C of Example 1. The precipitate is crystallized from acetone-hexane to yield 6α-methylhydrocortisone.

D. 6α-METHYLPREDNISOLONE

The 6α-methylhydrocortisone prepared above is treated as in procedure D of Example 1 to give a residue which is crystallized from methanol to yield the compound of this example, 6α-methylprednisolone.

EXAMPLE 6

6α-Methylprednisolone 21-Acetate

The product of Example 5 is acetylated as in Example 2. The precipitate is crystallized from methylene chloride-hexane to yield 6α-methylprednisolone 21-acetate.

EXAMPLE 7

6α-Methylprednisone 21-Acetate

The product of Example 6 is oxidized as described in Example 3. The crude product is recrystallized from methanol to yield 6α-methylprednisone 21-acetate.

I claim:
1. A process which comprises reacting a 3-keto-4-pregnene selected from the group consisting of 4-pregnene-17α,21-diol-3,11,20-trione, 4-pregnene-11β,17α,21-triol-3,20-dione, 9α-fluoro-4-pregnene-17α,21-diol-3,11,20-trione, 9α-fluoro-4-pregnene-11β,17α,21-triol-3,20-dione and the 21-esters thereof with a cyclic secondary amine having a methyl group on a carbon atom adjacent to the nitrogen atom to cause the formation of a 3-amino-3,5-pregnadiene; alkylating said pregnadiene at the 6-carbon position; hydrolyzing said pregnadiene to cause the regeneration of the 3-keto-4-pregnene; and subjecting this latter product to microbiological dehydrogenation with *Bacillus sphaericus* to cause the production of the corresponding 3-keto-1,4-pregnadiene alkylated at the 6-carbon position.

2. A process which comprises reacting a 3-keto-4-pregnene selected from the group consisting of 4-pregnene-17α,21-diol-3,11,20-trione, 4-pregnene-11β,17α,21-triol-3,20-dione, 9α-fluoro-4-pregnene-17α,21-diol-3,11,20-trione, 9α-fluoro-4-pregnene-11β,17α,21-triol-3,20-dione and the 21-esters thereof with a cyclic secondary amine having a methyl group on a carbon atom adjacent to the nitrogen atom to cause the formation of the corresponding 3-amino-3,5-pregnadiene of said 3-keto-4-pregnene and said cyclic amine; alkylating said 3-amino-3,5-pregnadiene to produce the corresponding 3-amino-6-methyl-3,5-pregnadiene; hydrolzing said pregnadiene to cause the preparation of the corresponding 6-methyl-3-keto-4-pregnene selected from the group consisting of 4-pregnene-17α,21-diol-3,11,20-trione, 4-pregnene-11β,17α,21-triol-3,20-dione, 9α-fluoro-4-pregnene-17α,21-diol-3,11,20-trione, 9α-fluoro-4-pregnene-11β,17α,21-triol-3,20-dione and the 21-esters thereof and subjecting said 6-methyl-4-pregnene to the microbiological dehydrogenative activity of *Bacillus sphaericus* to cause the formation of the corresponding 1,4-diene of said 3-keto-4-pregnene.

3. A process which comprises reacting a 3-keto-4-pregnene selected from the group consisting of 4-pregnene-17α,21-diol-3,11,20-trione, 4-pregnene-11β,17α,21-triol-3,20-dione, 9α-fluoro-4-pregnene-17α,21-diol-3,11,20-trione, 9α-fluoro-4-pregnene-11β,17α,21-triol-3,20-dione and the 21-esters thereof with a cyclic secondary amine having a methyl group on a carbon atom adjacent to the nitrogen atom to cause the formation of the corresponding 3-amino-3,5-pregnadiene of said 3-keto-4-pregnene and said cyclic amine; alkylating said 3-amino-3,5-pregnadiene to produce the corresponding 3-amino-6-methyl-3,5-pregnadiene; hydrolyzing said pregnadiene to cause the preparation of the corresponding 6-methyl-3-keto-4-pregnene selected from the group consisting of 4-pregnene-17α,21-diol - 3,11,20 - trione, 4 - pregnene - 11β,17α,21 - triol - 3,20 - dione, 9α - fluoro - 4 - pregnene - 17α,21 - diol - 3,11,20 - triol, 9α - fluoro - 4 - pregnene - 11β,17α,21-triol-3,20-dione and the 21-esters thereof.

4. A process which comprises reacting a 3-keto-4-pregnene selected from the group consisting of 4-pregnene-17α,21 - diol - 3,11,20 - trione, 4 - pregnene - 11β,17α,21 - triol - 3,20 - dione, 9α - fluoro - 4 - pregnene - 17α,21 - diol - 3,11,20 - trione, 9α - fluoro - 4 - pregnene - 11β, 17α,21 - triol - 3,20 - dione and the 21-esters thereof with a cyclic secondary amine having a methyl group on a carbon atom adjacent to the nitrogen atom to cause the formation of the corresponding 3-amino-3,5-pregnadiene derivative thereof; and alkylating said 3-amino-3,5-pregnadiene derivative to produce the corresponding 3-amino-6-methyl-3,5-pregnadiene.

5. A process which comprises reacting a 3,5-pregnadiene selected from the group consisting of 3-X-3,5-pregnadiene - 17α,21 - diol - 11,20 - dione, 3-X-3,5-pregnadiene - 11β,17α,21 - triol - 20 - one, 3-X-9α - fluoro - 3, 5 - pregnadiene - 17α,21 - diol - 11,20 - dione, 3-X-9α-fluoro-3,5-pregnadiene-11β,17α,21-triol-20-one and the 21-esters thereof wherein X is a cyclic secondary amine substituent having a methyl group on a carbon atom adjacent to the nitrogen atom with a methylating agent to cause the formation of the corresponding 6-methyl-3-amino-3,5-pregnadiene.

6. A process which comprises reacting 3-(2′,6′-dimethylpiperidino) - 9α - fluoro - 3,5 - pregnadiene - 11β,17α, 21-triol-20-one with methyl iodide to yield the corresponding 6-methyl ene-amine thereof.

7. A process which comprises reacting 3-(2′-methylpiperidino) - 3,5 - pregnadiene - 17α,21 - diol - 11,20-dione 21-diethylacetate with methyliodide to yield the corresponding 6-methyl ene-amine thereof.

8. A process which comprises reacting 3-(2′,6′-dimethylpiperidino) - 3,5 - pregnadiene - 11β,17α,21 - triol - 20-one 21-acetate with methyliodide to yield the corresponding 6-methyl ene-amine thereof.

9. 3 - (2′,6′ - dimethylpiperidino) - 6 - methyl - 9α-fluoro - 3,5 - pregnadiene - 11β,17α,21 - triol - 20 - one 21-acetate.

10. 3 - (2′ - methylpiperidino) - 6 - methyl - 3,5 - pregnadiene - 17α,21 - diol - 11,20 - dione 21 - diethylacetate.

11. 3 - (2′,6′ - dimethylpiperidino) - 6 - methyl - 3,5-pregnadiene-11β,17α,21-triol-20-one 21-acetate.

12. A compound of the formula:

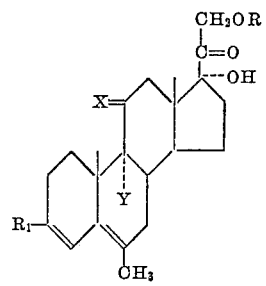

wherein X is selected from the group consisting of O and (H, βOH); Y is selected from the group consisting of H and F; R is selected from the group consisting of H and acyl; and $R_1$ is selected from the group consisting of 2-methyl piperidine and 2,6-dimethylpiperidine.

References Cited in the file of this patent
UNITED STATES PATENTS

| | | |
|---|---|---|
| 2,781,342 | Herr | Feb. 12, 1957 |
| 2,781,343 | Magerlein | Feb. 12, 1957 |
| 2,852,511 | Fried | Sept. 16, 1958 |
| 2,897,218 | Sebek | July 28, 1959 |

OTHER REFERENCES

Stoudt, 50 Chem. Abstracts, page 3558, March 10, 1956.

Spero et al.: J.A.C.S. 78, December 5, 1956, pages 6213, 6214.